United States Patent
Zou et al.

(10) Patent No.: US 10,581,993 B2
(45) Date of Patent: Mar. 3, 2020

(54) METHOD FOR FORWARDING TRAFFIC IN APPLICATION ON MOBILE INTELLIGENT TERMINAL

(71) Applicant: WANGSU SCIENCE & TECHNOLOGY CO., LTD., Shanghai (CN)

(72) Inventors: Shuang Zou, Shanghai (CN); Mingxun Zhang, Shanghai (CN); Hong Chen, Shanghai (CN); Shuyou Yang, Shanghai (CN); Hansheng Lian, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 363 days.

(21) Appl. No.: 15/507,277

(22) PCT Filed: Feb. 13, 2015

(86) PCT No.: PCT/CN2015/073000
§ 371 (c)(1),
(2) Date: Feb. 28, 2017

(87) PCT Pub. No.: WO2016/041322
PCT Pub. Date: Mar. 24, 2016

(65) Prior Publication Data
US 2017/0257449 A1    Sep. 7, 2017

(30) Foreign Application Priority Data
Sep. 16, 2014   (CN) .......................... 2014 1 0471822

(51) Int. Cl.
*H04L 29/08*  (2006.01)
*H04L 29/06*  (2006.01)
(Continued)

(52) U.S. Cl.
CPC .............. *H04L 67/28* (2013.01); *H04L 29/06* (2013.01); *H04L 65/1059* (2013.01);
(Continued)

(58) Field of Classification Search
CPC ......... H04L 67/28; H04L 67/02; H04L 67/34; H04L 67/32; H04L 65/1059; H04L 65/4096; H04W 12/2007; H04W 4/50
See application file for complete search history.

(56) References Cited

U.S. PATENT DOCUMENTS 6,247,048 B1 * 6/2001 Greer .................... H04L 29/06
709/219
2011/0282997 A1 * 11/2011 Prince .................. G06F 16/958
709/226

(Continued)

FOREIGN PATENT DOCUMENTS

CN   101909326 A    12/2010
CN   103916405 A *  7/2014
(Continued)

OTHER PUBLICATIONS

The European Patent Office (EPO) The partial European search report for 15842497.8 dated Mar. 8 2018 14 Pages.
(Continued)

*Primary Examiner* — Michael A Keller
*Assistant Examiner* — Jsing Forng Lin
(74) *Attorney, Agent, or Firm* — Anova Law Group, PLLC (57) ABSTRACT

The present disclosure provides a method for forwarding traffic in an application installed on a mobile intelligent terminal. The method may be suitable in iOS operating system. The method may include the following steps: 1) when an application in the iOS operating system is starting, determining whether a proxy service is required based on a
(Continued)

configuration of the application, and when the proxy service is required, the application executing a network proxy managing operation: replacing a native HTTP proxy function in a dynamic library of the iOS operating system with an updated HTTP proxy function, the updated HTTP function including information of a proxy server; and replacing a native Socket connect-create function in the dynamic library of the iOS operating system with an updated Socket connect-create function, a connection target of the updated Socket connect-create function being the proxy server.

6 Claims, 8 Drawing Sheets

(51) Int. Cl.
*H04W 12/00* (2009.01)
*H04W 4/50* (2018.01)

(52) U.S. Cl.
CPC .......... *H04L 67/02* (2013.01); *H04L 67/2814* (2013.01); *H04L 67/32* (2013.01); *H04L 67/34* (2013.01); *H04L 69/16* (2013.01); *H04W 4/50* (2018.02); *H04W 12/0027* (2019.01); *H04L 65/4069* (2013.01)

(56) References Cited

U.S. PATENT DOCUMENTS

| 2012/0084423 A1* | 4/2012 | McGleenon ........ H04L 61/1511 709/223 |
| 2012/0084460 A1* | 4/2012 | McGinnity ........... H04L 67/322 709/242 |
| 2013/0340031 A1 | 12/2013 | Amit et al. |
| 2014/0122580 A1* | 5/2014 | Nuaimi ............... H04L 63/0281 709/203 |
| 2014/0148255 A1 | 5/2014 | Chan |
| 2015/0207894 A1* | 7/2015 | De Los Reyes ........ H04L 67/28 709/219 |
| 2015/0312325 A1* | 10/2015 | Lowekamp ............. H04L 67/02 709/203 |

FOREIGN PATENT DOCUMENTS

| CN | 103916405 A | 7/2014 |
| CN | 103944906 A | 7/2014 |
| WO | 2012018556 A2 | 2/2012 |

OTHER PUBLICATIONS

The World Intellectual Property Organization (WIPO) International Search Report for PCT/CN2015/073000 dated Jun. 12, 2015 5 Pages.

* cited by examiner

METHOD FOR FORWARDING TRAFFIC IN APPLICATION ON MOBILE INTELLIGENT TERMINAL

CROSS-REFERENCES TO RELATED APPLICATIONS

This patent application is a national phase entry under 35 U.S.C. § 371 of PCT Application No. PCT/CN2015/073000 filed on Feb. 13, 2015, which claims priority of Chinese patent application No. 201410471822.8, filed on Sep. 16, 2014, the entire content of all of which is incorporated herein by reference.

FIELD OF THE DISCLOSURE

The present invention generally relates to the field of internet technology, more particularly, relates to a method for forwarding traffic in an application on a mobile intelligent terminal.

BACKGROUND

A mobile intelligent terminal, like a personal computer, can be operated on its independent operating system. Users can install programs provided by third-party services such as software and games on a mobile intelligent terminal. Users can expand the functions of a mobile intelligent terminal by continuously installing such programs. Portable devices, implemented with wireless network connections, can be connected to mobile intelligent terminals through mobile communication network. Common mobile intelligent terminals include smart phones and tablet computers. Being highly portable, mobile intelligent terminals are becoming the most commonly used electronic devices.

One of the most commonly used functions of a mobile intelligent terminal is internet access. Using a mobile intelligent terminal to access internet is gradually replacing the traditional internet access means using a desktop computer or a laptop computer. Given the current trend, it is desired that a mobile intelligent terminal also has the various internet services that were only available on a laptop computer or a desktop computer, such as network proxy services.

A network proxy service enables indirect connection between a network terminal (often a client) and another network terminal (often a server) through the network proxy service. Network proxy services can better protect the privacy and/or security of the network terminal, prevent attacks, cache the contents of the source server, and reduce load of the source server.

Currently, to implement network proxy services on mobile intelligent terminals, the following methods are often used.

First, canonical name (CNAME) method is often used to implement network proxy services on mobile intelligent terminals. CNAME method allows multiple names to be mapped to the same computer. Domain names may be mapped to the address of the proxy server through domain name system (DNS). The disadvantage of the CNAME method includes being limited to only HTTP/HTTPS protocol, and having a delay time after configuration, that is, the CNAME method does not take effect immediately.

Second, access point name (APN) method is also used to implement network proxy services on mobile intelligent terminals. APN (an access point) is configured to guide traffic. The disadvantage of the APN method includes that, all the applications on the mobile intelligent terminal with the APN have to be configured with the proxy server. The security of the mobile intelligent terminal may be low.

Third, code control method is also used to implement network proxy services on the mobile intelligent terminals. Application developers can directly configure proxy settings fur each network request in the code of the application, and send traffic to the proxy server. The disadvantage of the code control method includes requiring significant modifications to application code and low levels of code reuse. In certain operating systems, e.g., Apple's iOS, proxy servers cannot be configured.

BRIEF SUMMARY OF THE DISCLOSURE

The present invention provides a solution to the described technical problem. The present invention provides a method for forwarding traffic in an application installed on a mobile intelligent terminal. The method may allow the proxy setting of an individual application to be configured. The method can be used in operating systems such as Apple's iOS.

The present invention provides a method for forwarding traffic in an application installed on a mobile intelligent terminal. The method may be suitable in iOS operating system. The method may include the following steps: 1) when an application in the iOS operating system is starting, determining whether a proxy service is required based on a configuration of the application, and when the proxy service is required, the application executing a network proxy managing operation: replacing a native HTTP proxy function in a dynamic library of the iOS operating system with an updated HTTP proxy function, the updated HTTP function including information of a proxy server; and replacing a native Socket connect-create function in the dynamic library of the iOS operating system with an updated Socket connect-create function, a connection target of the updated Socket connect-create function being the proxy server. 2) when the application sends a HTTP request or a HTTPs request, utilizing the updated HTTP proxy function to point to the proxy server, and when the application sends a TCP/IP request, utilizing the updated Socket connect-create function to point to the proxy server.

In one embodiment, the network proxy managing operation may further include: replacing native video display-related functions in a multimedia system library of the iOS operating system with a plurality of updated video display-related functions; and when the application accesses a remote video, utilizing the plurality of updated video display-related functions to access the proxy server.

In one embodiment, in 1), a process of replacing the native HTTP proxy function in the dynamic library of the iOS operating system with the updated HTTP proxy function includes: creating the updated HTTP proxy function, the updated HTTP proxy function including a first pointer address; calculating an offset value of the native HTTP proxy function in the dynamic library to obtain a second pointer address of the native HTTP proxy function in the dynamic library; and pointing the second pointer address to the updated HTTP proxy function and pointing the first pointer address to the native HTTP proxy function.

In one embodiment, in 1), a process of replacing the native Socket connect-create function in the dynamic library of the iOS operating system with the updated Socket connect-create function may include: calculating an offset value of the native Socket connect-create function in the dynamic library to obtain a first pointer address of the native Socket connect-create function in the dynamic library; and pointing the first pointer address to the updated Socket connect-create function, and pointing the second pointer address that is originally pointed to the updated Socket connect-create function to the native Socket connect-create function.

In one embodiment, a process of replacing the native video display-related functions in the multimedia system library of the iOS operating system with the plurality of updated video display-related functions may include: creating categories in the multimedia system library; creating updated video display-related functions in each category; obtaining a pointer of each native video display-related function in the multimedia system library; and replacing a pointer of each updated video display-related function with the pointer of each native video display-related function in the multimedia system library.

In one embodiment, replacing pointers is implemented by using a runtime technique.

In one embodiment, the application may include a software development kit, the application calls the software development kit to start network proxy managing operation.

In one embodiment, the application may contain code of the software development kit.

By using the disclosed technical solution, compared to conventional methods, the disclosed method may include the following features.

1. The method may support a desired number of protocols. For example, the method may be support HTTP/HTTPs protocol and other protocols based on the application layer.

2. The method may have quick response. Actions such as determining whether the proxy switch should be used and modifying the address of the proxy server may become effective immediately.

3. The method, may have little or no impact on other applications. The method may ensure that only the traffic of the application that requires proxy services is forwarded to the proxy server. Little or no impact is applied on other applications installed on the mobile intelligent terminal.

BRIEF DESCRIPTION OF THE DRAWINGS

To make the above objects, features, and advantage of the disclosure more apparent and easy to understand, specific embodiments of the present disclosure will now be described in detail with reference to the drawings of the present disclosure.

DETAILED DESCRIPTION

Embodiments of the present disclosure provide a method for forwarding network requests to a designated server (also referred to as a proxy server in following description) on a mobile intelligent terminal platform. The mobile intelligent terminal platform described in the disclosed embodiments may be Apple's iOS operating system, etc.

Conventional CNAME method is limited only to HTTP/HTTPS protocol, and a delay time is resulted after configuration. Thus, the CNAME method may not take effect immediately. Conventional MIN method requires all applications installed on a mobile intelligent terminal to use the configured proxy server. Conventional code control method requires direct proxy settings for each network request in the code of the applications. The code control method requires significant modifications to code and results low levels of code reuse. In certain operating systems, e.g., Apple's iOS operating system proxy settings often cannot be configured using the code control method.

Embodiments of the present disclosure may be suitable for network requests of various protocols. The protocols include but are not limited to HTTP/HTTPS protocol, TCP/IP protocol, and video display protocol. In addition, in some embodiments, proxy settings of individual application may be configured. Further, in some embodiments, no significant modifications to the code of the application is required.

In the disclosed embodiments, configuration of proxy settings may be implemented through a series of network proxy managing operations when an application is starting or in a suitable time period after the application starts. The network proxy managing operation may implement interactions between the application and the operating system of the mobile intelligent terminal. The network proxy managing operation may also temporarily modify related functions in the operating system when the application is mining. Through the interaction and the modification, the operating system may selectively configure a proxy server for the application and allow the network requests fir various protocols of the application to be directed to the proxy server. For the application, after the initial network proxy managing operation, the proxy server for each subsequent network request may not need not to be specified. The related functions of the operating system, after the modification, may be used to configure the proxy server.

Figure 1:
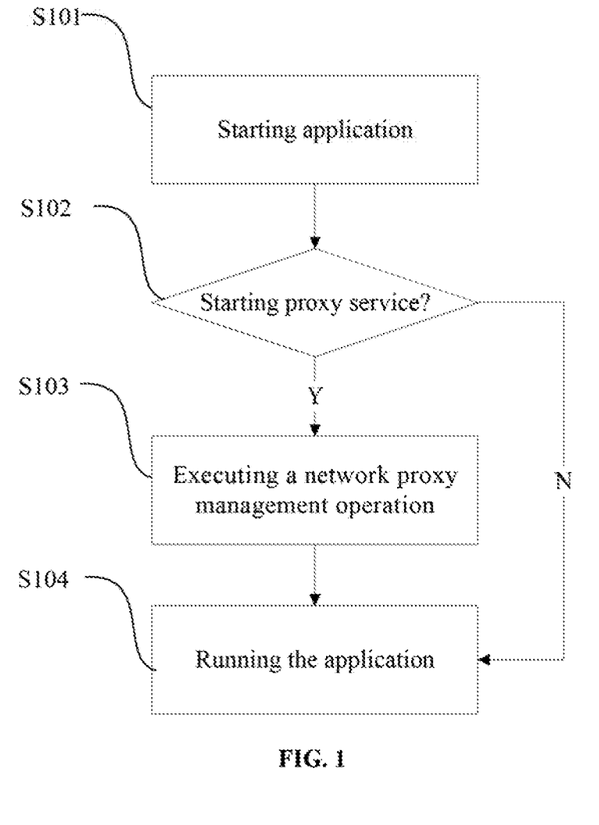
FIG. 1 illustrates an exemplary flow chart of starting a proxy service according to the disclosed embodiments of the present disclosure.

FIG. 1 illustrates an exemplary process of starting a proxy service. As shown in FIG. 1, in step S101, an application in the iOS operating system may be started. For example, the application may be started to respond to a user's action. The application may include the code required for implementing the network proxy managing operation. Details of the network proxy managing operation may be described later in the disclosure. In step S102, whether a proxy service is required to start may be determined based on the configuration of the application. When a proxy service is required, the process may be directed to step S103 so that a network proxy managing operation may be executed on the application. Further, the process may proceed to step S104. When no proxy service is required, the process may directly proceed to step S104 to run the application.

The application may set a proxy switch by default. For example, the application may switch on or switch off a proxy service. In one embodiment, the application may allow the user to modify the settings of the proxy switch. Further, the application may set the address of the proxy server, the port of the proxy server, and other information by default. In one embodiment, the application may allow the user to modify the address of the proxy server, the port of the proxy server, and other information by default.

Figure 2:
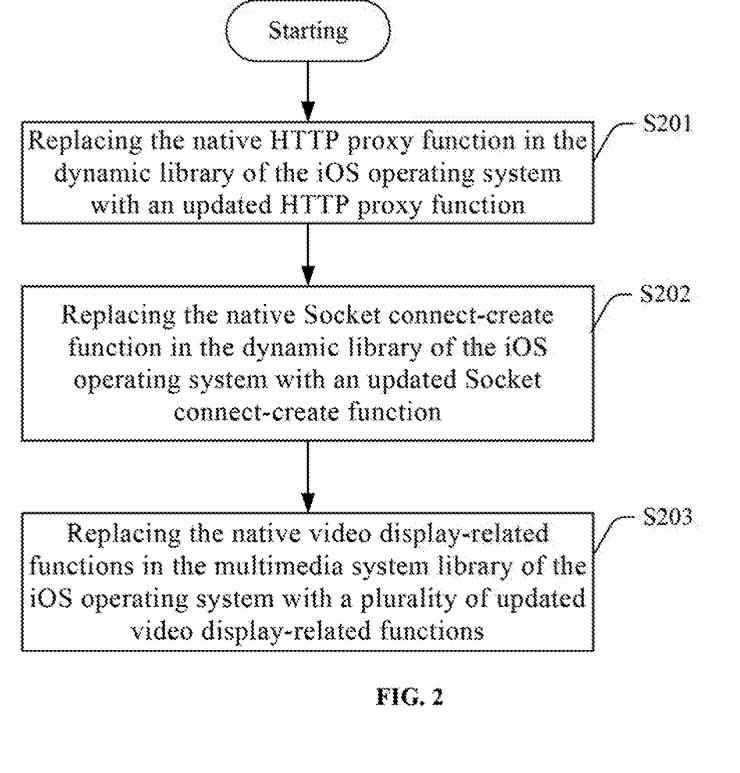
FIG. 2 illustrates a flow chart of an exemplary network proxy managing operation according to the disclosed embodiments of the present disclosure.

FIG. 2 illustrates an exemplary process of a network proxy managing operation in one embodiment of the present disclosure. As shown in FIG. 2, the proxy management operation may include steps S201-S203.

In step S201, the native HTTP proxy function in the dynamic library of the iOS operating system may be replaced with an updated HTTP proxy function. The updated HTTP proxy function may contain information of the proxy server.

In step S202, the native Socket connect-create function in the dynamic library of the iOS operating system may be replaced with an updated Socket connect-create function. The target connection of the updated Socket connect-create function may be the proxy server.

In step S203, the native video display-related functions in the multimedia system library of the iOS operating system may be replaced with a plurality of updated video display-related functions.

The network proxy managing operation may include a portion of or all of steps S201-S203. In addition, the execution of steps S201-S203 may be subjected to a desired sequence and should not be limited to the sequence shown in FIG. 2.

Specifically, an HTTP proxy function may be a proxy function used for HTTP requests or HTTPs requests in the dynamic library of the iOS operating system. When iOS operating system receives an HTTP request or an HTTPs request, the iOS operating system may utilize the proxy settings of the HTTP function to connect to the designated proxy server. By replacing the HTTP function, the proxy settings required by the application may be modified into the iOS operating system. Thus, when the application sends an HTTP request or an HTTPs request to the iOS operating system, the iOS operating system may utilize the updated HTTP function to point to the designated proxy server.

Similarly, a Socket connect-create function may be a function for TCP/IP requests through Socket connection in the dynamic library of the iOS operating system. When the iOS operating system receives a TCP request, the iOS operating system may utilize the Socket, is connect-create function to connect to the set target address. By replacing the Socket connect-create function, the proxy server required by the application may be modified into the iOS operating system. Thus, when the application sends a TCP/IP request to the iOS operating system, the OS operating system may utilize the updated Socket connect-create function to connect to the proxy server.

Similarly, the multimedia system library in the iOS operating system may utilize a plurality of video display-related functions to connect to remote resources. By replacing the video display-related functions, the proxy server required by the application may be modified into the iOS operating system. Thus, when the application sends a video display request to the iOS operating system, the iOS operating system may utilize the updated video display-related function to connect to the proxy server.

Methods to replace the above-mentioned various functions are now described below in detail.

Figure 3:
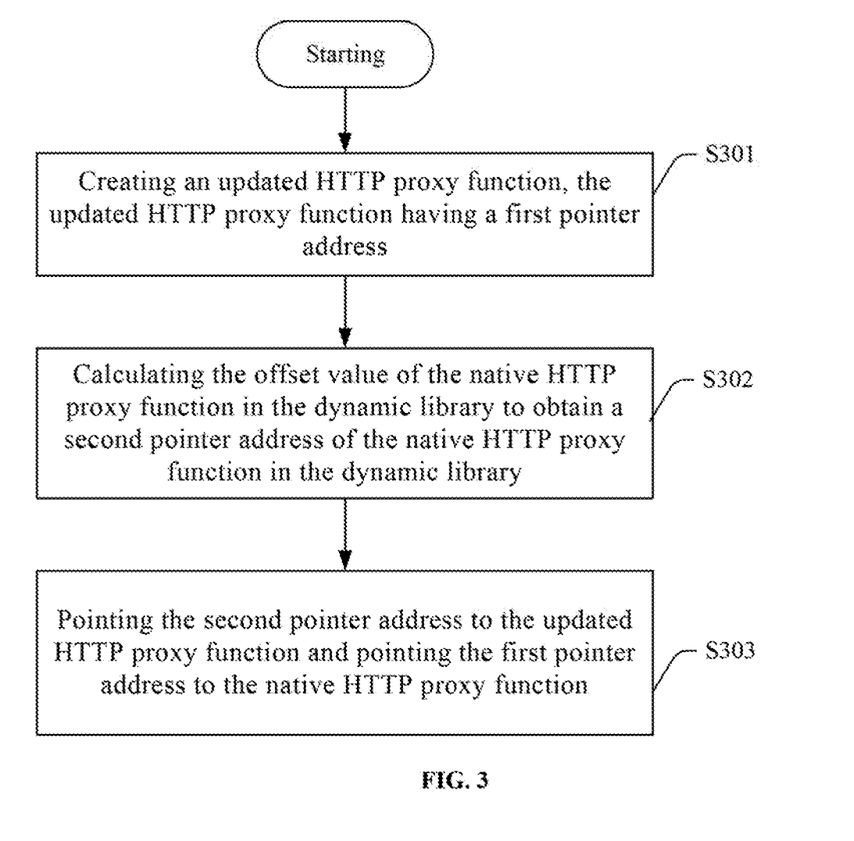
FIG. 3 illustrates an exemplary flow chart to replace an HTTP proxy function according to the disclosed embodiments of the present disclosure.

FIG. 3 illustrates an exemplary process flow to replace the HTTP proxy function. The process to replace the native HTTP proxy function in the dynamic library of the iOS operating system with an updated HTTP proxy function may include steps S301-S303.

In step S301, an updated HTTP proxy function may be created. The updated HTTP proxy function may have a first pointer address.

In this step, the HTTP proxy settings required to be configured may be added into the updated HTTP proxy function.

In step S302, the offset value of the native HTTP proxy function in the dynamic library may be calculated to obtain a second pointer address of the native HTTP proxy function in the dynamic library.

In step S303, the second pointer address may be pointed to the updated HTTP proxy function and the first pointer address may be pointed to the native HTTP proxy function.

In addition, the iOS operating system may maintain the pointer address of the native HTTP proxy function.

Figure 4:
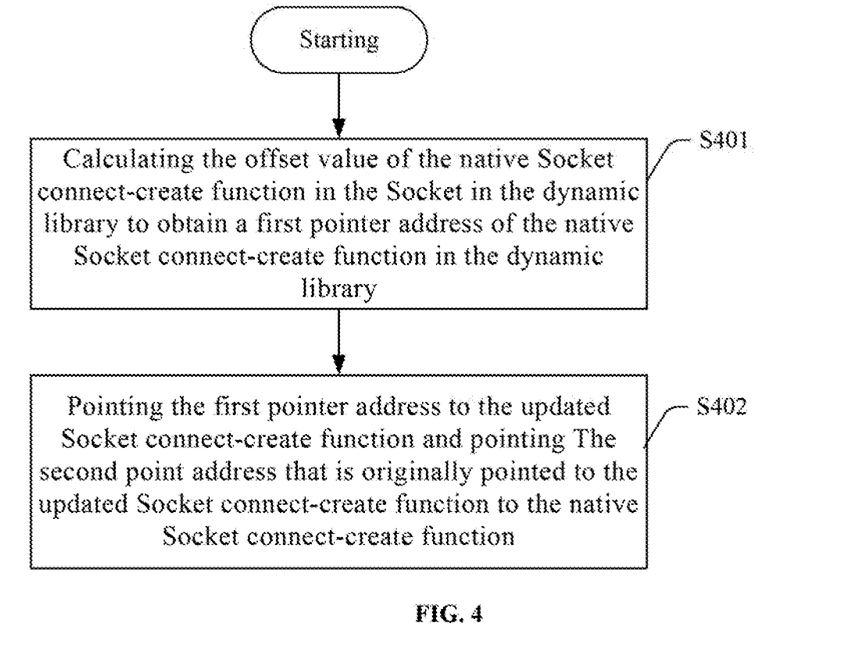
FIG. 4 illustrates an exemplary flow chart to replace a Socket connect-create function according to the disclosed embodiments of the present disclosure.

FIG. 4 illustrates an exemplary process flow to replace the Socket connect-create function. As shown in FIG. 4, the process of replacing the native Socket connect-create function in the dynamic library of the iOS operating system with an updated. Socket connect-create function may include steps S401 and S402.

In step S401, the offset value of the native Socket connect-create function in the Socket in the dynamic library may be calculated to obtain a first pointer address of the native Socket connect-create function in the dynamic library.

In iOS operating system, the Socket connect-create function may be "connect". In one embodiment, the updated Socket connect-create function may be named as "connect wrapper". The updated Socket connect-create function "connect-wrapper" may set the proxy server as the target address and may establish the Socket connection.

Specifically, the offset value of the connect in the Socket may be calculated to obtain the pointer address of connect in the dynamic library.

In step S402, the first pointer address may be pointed to the updated Socket connect-create function and the second point address, which is originally pointed to the updated Socket connect-create function, may be pointed to the native Socket connect-create function.

Specifically, the function pointer of the updated Socket connect-create function "connect-wrapper" and the function pointer of the "connect" in the dynamic library may be switched.

In addition, the original "connect" may be saved as "connect_original".

It should be noted that, Socket may also include a connect-close function "close". Although "close" may not contain any proxy settings, the connect-close function "close" may also be replaced when the connect-create function "connect" is replaced. Specifically, the offset value of "close" in the Socket in the dynamic library may be calculated to obtain the pointer address of "close" in the dynamic library. The function pointer of "close_wrapper" and the function pointer of "close" may be switched. The original "close" may be saved as "close_original".

In one embodiment of the present disclosure, function pointer switch technique in the dynamic library of the iOS operating system may be utilized to implement the switching of the HTTP proxy function, the Socket connect-create function, and the Socket connect-close function.

Figure 5:
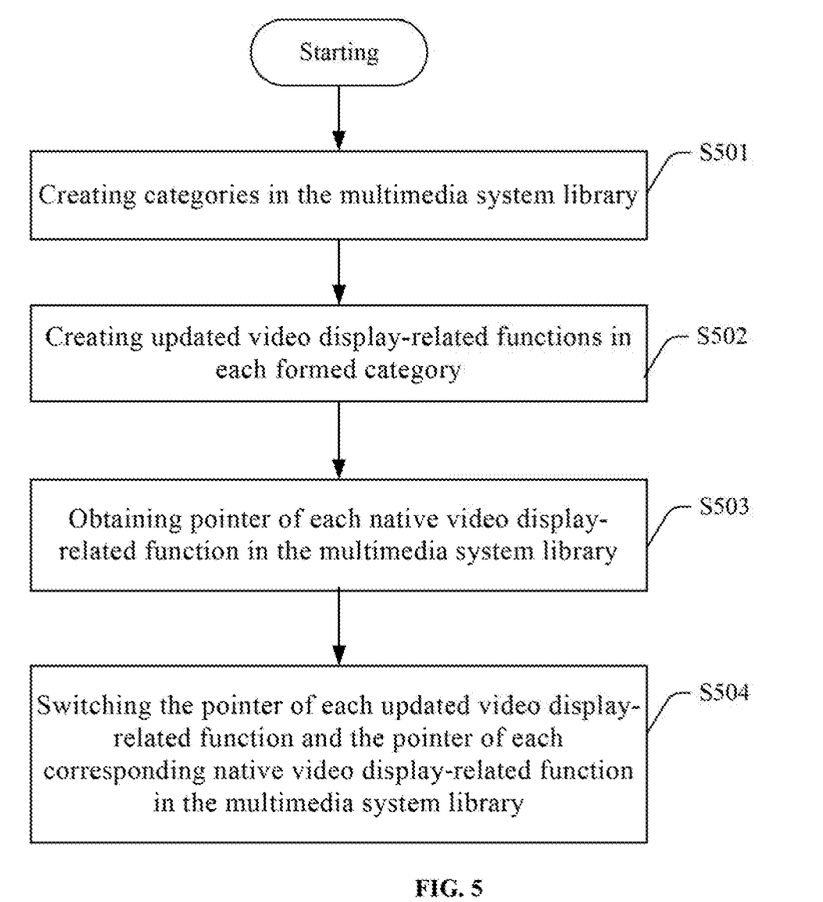
FIG. 5 illustrates an exemplary flow chart to replace video display-related functions according to the disclosed embodiments of the present disclosure.

FIG. 5 illustrates an exemplary process flow to replace the video display-related functions. As shown in FIG. 5, the process to replace the native video display-related functions in the multimedia system library of the iOS operating system with a plurality of updated video display-related functions nay include steps S501-S504.

In step S501, categories may be created in the multimedia system library.

The multimedia system library of the iOS operating system may include a multimedia system library containing AVPlayer and AVPlayerItem, and another multimedia system library containing MPMoviePlayerController.

Thus, categories may be created for AVPlayer, AVPlayerItem, and MPMoviePlayerController.

In step S502, updated video display-related functions may be created in each formed category.

Specifically, initWithURLProxy and playerWithURLProxy may be created in the AVPlayer category; initWithURLProxy and playerItemWithURLProxy may be created in the AVPlayerItem category; and initWithContentURLProxy may be created in the MPMoviePlayerController category.

The functions initWithURLProxy, playerWithURLProxy, playerItemWithURLProxy, and initWithContentURLProxy may be video display-related functions. These functions may be configured to create respective instances. An instance may determine if the uniform resource locator (URL) is a remote URL. If the URL is determined to be a remote URL, the target address may be set to be the address of a proxy server.

In step S503, pointer of each native video display-related function in the multimedia system library may be obtained.

Specifically, the pointers of the instance functions of AVPlayer, AVPlayerItem, and MPMoviePlayerController may be obtained.

In step S504, the pointer of each updated video display-related function and the pointer of each corresponding native video display-related function in the multimedia system library may be replaced.

In one embodiment, method swizzling in the runtime technology of the iOS operating system may be utilized to switch pointers of the selectors.

Through the network proxy managing operation described in the embodiments above, functions required for various protocols may be replaced. In one embodiment, the network proxy managing operation may be executed through the code contained in the application. In another embodiment, the network proxy managing operation may be executed through a software development kit (SDK) called by the application. An advantage of using a SDK may be that, the developer of the application may not need to develop the code for network proxy managing operation. Instead, the developer may add a call for an SDK, developed by a third party, into the application to configure proxy settings.

Figure 6:
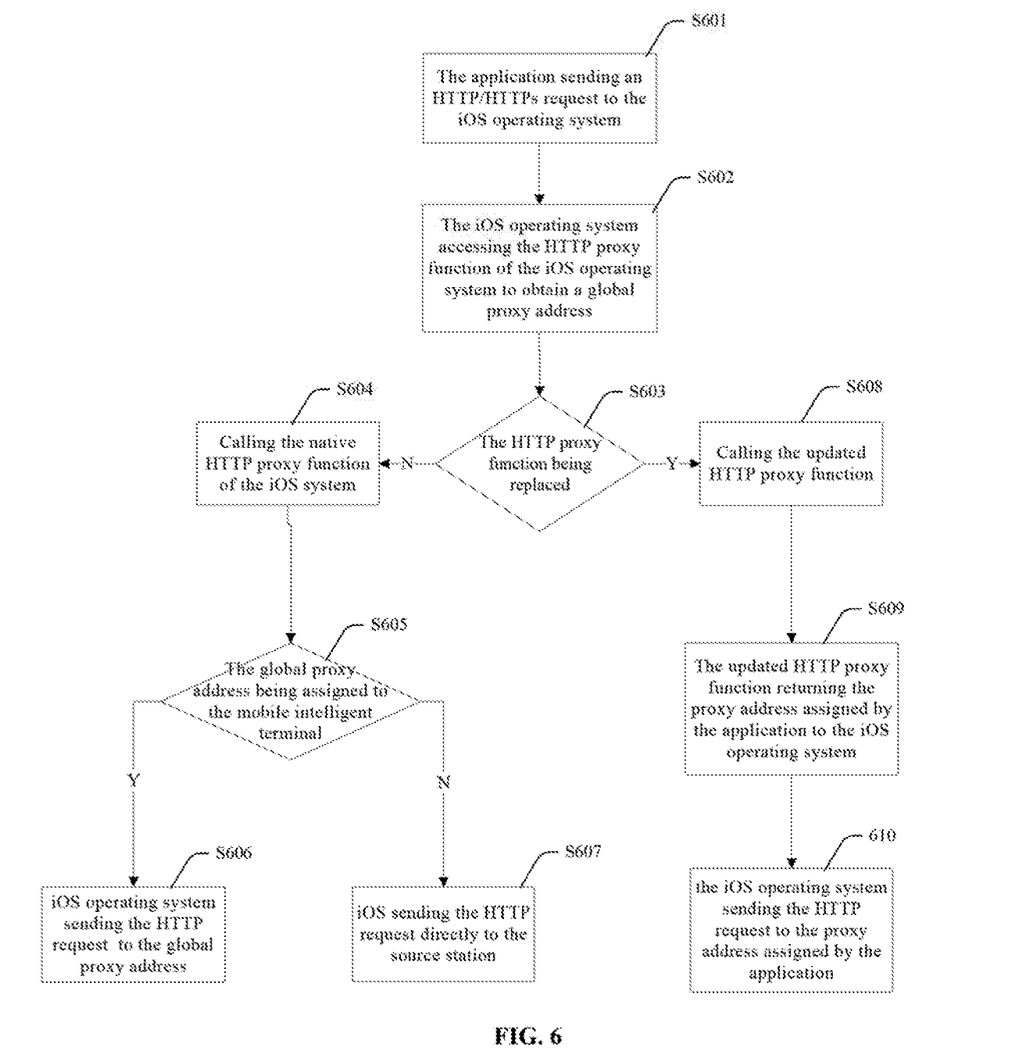
FIG. 6 illustrates an exemplary flow chart to access network using the hypertext transfer protocol (HTTP)/HTTPS protocol according to the disclosed embodiments of the present disclosure.

FIG. 6 illustrates an exemplary process flow to access network using HTTP/HTTPs protocol. As shown in FIG. 6, the process that the application accesses network based on the HTTP/HTTPs protocol may include steps S601-S610.

In step S601, the application may send an HTTP/HTTPs request to the iOS operating system.

In step S602, the iOS operating system may access the HTTP proxy function of the iOS operating system to obtain a global proxy address.

In step S603, based on if the HTTP proxy function has been replaced, the process may proceed to different steps. If the HTTP proxy function is not replaced, the process may proceed to steps S604-S607 (native system process). If the HTTP proxy function is replaced, the process may proceed to steps S608-S610 (proxy process).

In step S604, the native HTTP proxy function of the iOS system may be called.

In step S605, whether the global proxy address is assigned to the mobile intelligent terminal may be determined.

In step S606, if the global proxy address is assigned to the mobile intelligent terminal, the HTTP request may be sent to the global proxy address. The global proxy address may be effective to all applications installed on the mobile intelligent terminal.

In step S607, if the global proxy address is not assigned to the mobile intelligent terminal, the HTTP request may be directly sent to the source station.

In step S608, the updated HTTP proxy function, obtained by the application, may be called;

In step S609, the updated HTTP proxy function may return the proxy address, assigned by the application, to the iOS operating system.

In step S610, the iOS operating system may send the HTTP request to the proxy address assigned by the application.

Figure 7:
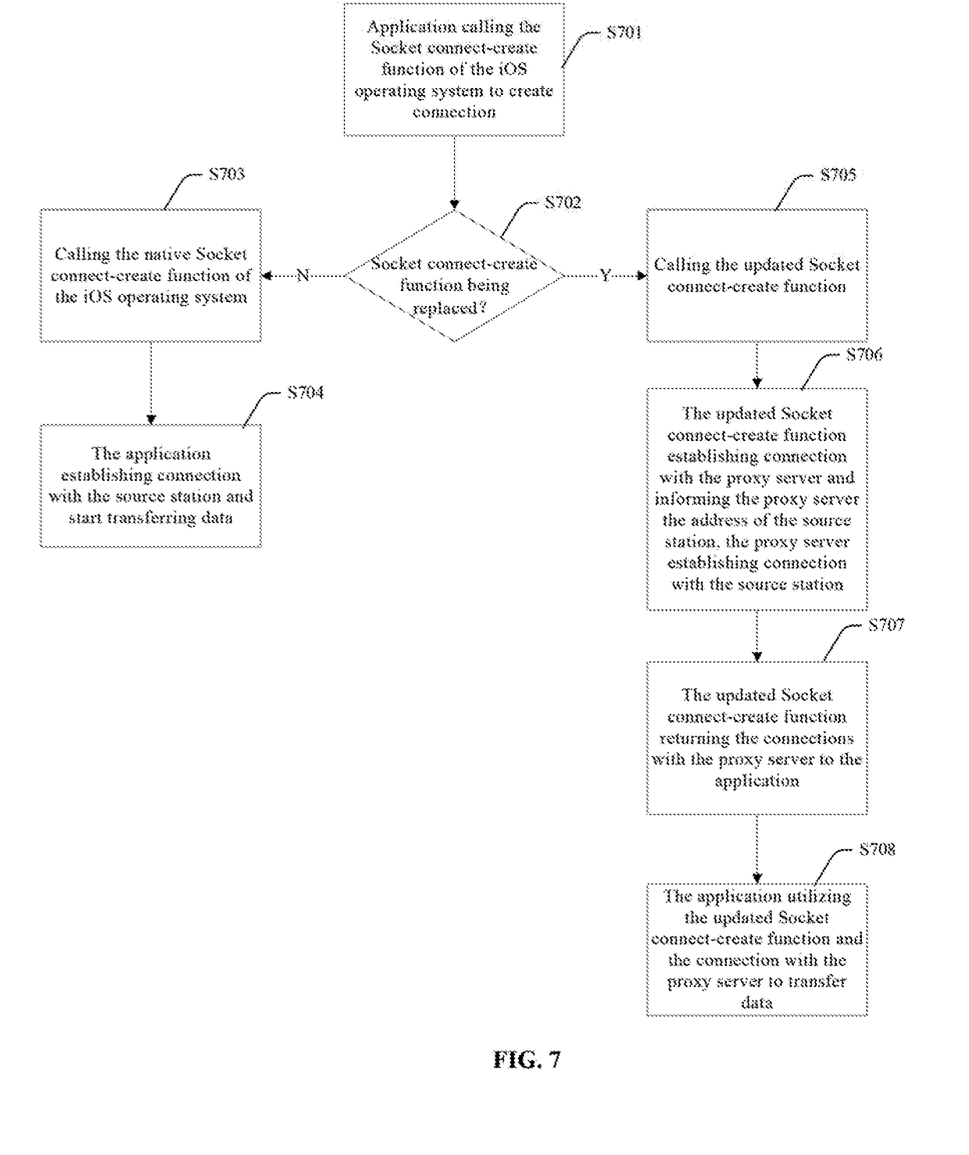
FIG. 7 illustrates an exemplary flow chart to access network using transmission control protocol (TCP) according to the disclosed embodiments of the present disclosure.

FIG. 7 illustrates an exemplary process flow to access network using TCP protocol. As shown in FIG. 7, the process that the application accesses network based on TCP protocol may include steps S701-S708.

In step S701, the application may call the Socket connect-create function of the iOS operating system to create connection.

In step S702, based on if the Socket connect-create function has been replaced, the process may proceed to different steps. If the Socket connect-create function is not replaced, the process may proceed to steps S703-S704 (native system process). If the Socket connect-create function is replaced, the process may proceed to steps S705-S708 (proxy process).

In step S703, the native Socket connect-create function of the iOS operating system may be called.

In step S704, the application may establish connection with the source station and start transferring data.

In step S705, the updated Socket connect-create function may be called;

In step S706, the updated Socket connect-create function may establish connection with the proxy server and inform the proxy server the address of the source station. The proxy server may establish connection with the source station.

In step S707 the updated Socket connect-create function may return the connections with the proxy server to the application.

In step S708, the application may utilize the updated Socket connect-create function and the connection with the proxy server to transfer data.

In one embodiment, step S706 may be implemented through the CONNECT method defined by the HTTP protocol or through proprietary protocols.

Figure 8:
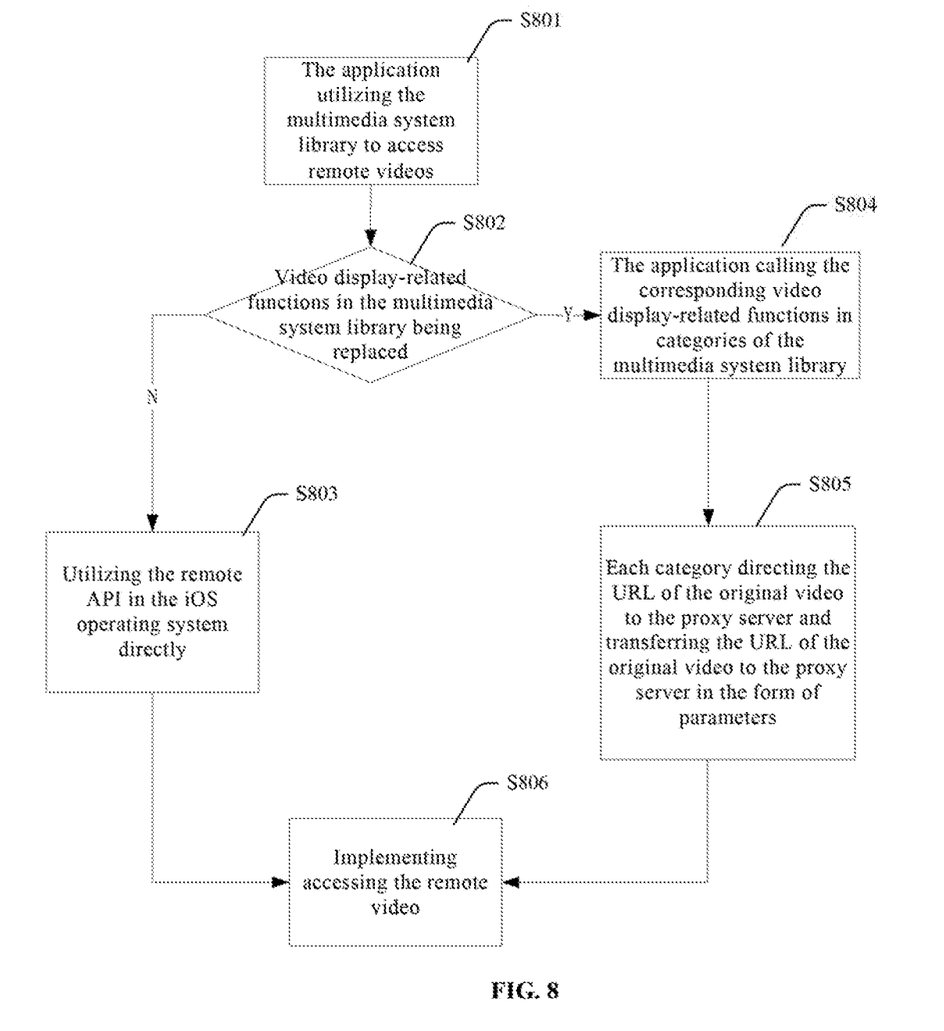
FIG. 8 illustrates an exemplary flow chart of displaying network videos using an application programming interface (API) provided by the iOS operating system according to the disclosed embodiments of the present disclosure.

FIG. 8 illustrates an exemplary process flow to display network video using the API provided by the iOS operating system. As shown in FIG. 8, the process that the application utilizes the multimedia system library to generate traffic may include steps S801-S806.

In step S801, the application may utilize the multimedia system library to access remote videos.

In step S802, based on if the video display-related functions in the multimedia system library have been replaced, the process may proceed to different steps. If the video display-related function is not replaced, the process may proceed to step S803 (native system process). If the video display-related function is replaced, the process may proceed to step S804 (proxy process).

In step S803, the remote API in the iOS operating system may be directly utilized.

In step S804, the application may call the corresponding video display-related functions in categories of the multimedia system library.

In step S805, each category may direct the URL of the original video to the proxy server and may transfer the URL of the original video to the proxy server in the form of parameters.

The proxy server may process the URL and connect to the remote server such that the proxy settings of video display may be configured.

In step S806, accessing the remote video may be implemented.

Compared to conventional methods, the disclosed method may include the following features.

1. The method may support a desired number of protocols. For example, the method may be support HTTP/HTTPs protocol and other protocols based on the application layer.

2. The method may have quick response. Actions such as determining whether the proxy switch should be used and modifying the address of the proxy server may become effective immediately.

3. The method may have little or no impact on other applications. The method may ensure that only the traffic of the application that requires proxy services is forwarded to the proxy server. Little or no impact is applied on other applications installed on the mobile intelligent terminal.

4. The method may have high compatibility. The method may be simple and transparent. The method may have little association with the application itself and may be compatible with most applications.

5. The implementation of the method may be simple. When using SDK to implement, the developer of the application may only need to add the SDK and a line of code into the development of the application. The method may enable the proxy function to be implement on the application at the lowest cost.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for forwarding traffic in an application on a mobile terminal, configured to be compatible with iOS operating system, comprising:
   when starting an application in the iOS operating system, determining whether a proxy service is required based on a configuration of the application, and when the proxy service is required, the application executing a network proxy management operation by:
   replacing a native HTTP proxy function in a dynamic library of the iOS operating system with an updated HTTP proxy function, the updated HTTP function including information of a designated proxy server; and
   replacing a native Socket connect-create function in the dynamic library of the iOS operating system with an updated Socket connect-create function, a connection target of the updated Socket connect-create function being the designated proxy server; and
   when the application sends a HTTP request or a HTTPs request, utilizing the updated HTTP proxy function to point to the designated proxy server, and when the application sends a TCP/IP request not associated with the HTTP request or the HTTPs request, utilizing the updated Socket connect-create function to point to the designated proxy server,
   wherein replacing the native HTTP proxy function in the dynamic library of the iOS operating system with the updated HTTP proxy function comprises:
   creating the updated HTTP proxy function, the updated HTTP proxy function including a first pointer address;
   calculating an offset value of the native HTTP proxy function in the dynamic library to obtain a second pointer address of the native HTTP proxy function in the dynamic library; and
   pointing the second pointer address to the updated HTTP proxy function and pointing the first pointer address to the native HTTP proxy function; and
   wherein replacing the native Socket connect-create function in the dynamic library of the iOS operating system with the updated Socket connect-create function comprises:
   calculating an offset value of the native Socket connect-create function in the dynamic library to obtain a first pointer address of the native Socket connect-create function in the dynamic library; and
   pointing the first pointer address of the native Socket connect-create function to the updated Socket connect-create function, and pointing a second pointer address that is originally pointed to the updated Socket connect-create function to the native Socket connect-create function.

2. The method according to claim 1, wherein the network proxy management operation further comprises:
   replacing native video display-related functions in a multimedia system library of the iOS operating system with a plurality of updated video display-related functions; and
   when the application accesses a remote video, utilizing the plurality of updated video display-related functions to access the designated proxy server.

3. The method according to claim 2, wherein replacing the native video display-related functions in the multimedia system library of the iOS operating system with the plurality of updated video display-related functions comprises:
   creating categories in the multimedia system library;
   creating updated video display-related functions in each category;
   obtaining a pointer of each native video display-related function in the multimedia system library; and
   switching a pointer of each updated video display-related function with the pointer of each native video display-related function in the multimedia system library.

4. The method according to claim 3, wherein switching the pointer is implemented by using a runtime technique.

5. The method according to claim 1, wherein the application comprises a software development kit, and the application calls the software development kit to start the network proxy management operation.

6. The method according to claim 5, wherein the application contains code of the software development kit.

* * * * *